United States Patent [19]

Davis

[11] Patent Number: 5,937,063

[45] Date of Patent: Aug. 10, 1999

[54] SECURE BOOT

[75] Inventor: Derek L. Davis, Phoenix, Ariz.

[73] Assignee: Intel Corporation, Santa Clara, Calif.

[21] Appl. No.: 08/722,298

[22] Filed: Sep. 30, 1996

[51] Int. Cl.$^6$ ...................................................... H04L 9/00
[52] U.S. Cl. .................................................. 380/4; 380/25
[58] Field of Search ............................................ 380/4, 25

[56] References Cited

U.S. PATENT DOCUMENTS

| | | | |
|---|---|---|---|
| 4,278,837 | 7/1981 | Best | 178/22.09 |
| 4,633,388 | 12/1986 | Chiu | 364/200 |
| 4,698,617 | 10/1987 | Bauer | 380/28 |
| 4,764,959 | 8/1988 | Watanabe et al. | 380/4 |
| 5,022,077 | 6/1991 | Bealkowski et al. | 380/4 |
| 5,359,659 | 10/1994 | Rosenthal | 380/4 |
| 5,377,264 | 12/1994 | Lee et al. . | |
| 5,386,469 | 1/1995 | Yearsley et al. | 380/3 |
| 5,421,006 | 5/1995 | Jablon et al. . | |
| 5,444,850 | 8/1995 | Chang . | |
| 5,450,489 | 9/1995 | Ostrover et al. . | |
| 5,479,509 | 12/1995 | Ugon . | |
| 5,509,120 | 4/1996 | Merkin et al. | 395/186 |
| 5,666,411 | 9/1997 | McCarty | 380/4 |
| 5,671,275 | 9/1997 | Ezuriko | 380/4 |
| 5,699,428 | 12/1997 | McDonnal et al. | 380/4 |

*Primary Examiner*—Salvatore Cangialosi
*Attorney, Agent, or Firm*—Blakely, Sokoloff, Taylor & Zafman

[57] ABSTRACT

A subsystem prevents unauthorized replacement of boot-up firmware (e.g., BIOS) embedded in modifiable non-volatile memory devices such as flash memory. The firmware device is contained in a secure boot device which is responsive to the host processor. The security protection is established by the encryption and decryption of the boot-up instructions using a secret key shared by both the secure boot device and the host processor.

36 Claims, 2 Drawing Sheets

SECURE BOOT

CROSS-REFERENCES TO RELATED APPLICATION

The named inventor of the present application has previously filed a United States Patent Application entitled "An Apparatus and Method for Cryptographic Companion Imprinting", filed Dec. 4, 1995 (application Ser. No. 08/566,910) now pending. This Application is owned by the same Assignee of the present Application.

BACKGROUND OF THE INVENTION

1. Field of the Invention

This invention relates to the field of security of computer firmware, especially in the areas of boot-up firmware including Operating System ("OS") and Basic Input and Output System ("BIOS") in general computing systems, in particular personal computers ("PCs").

2. Description of Related Art

One of the most critical elements in a computer system is boot-up firmware. The boot-up firmware may be an Operating System ("OS"), a portion of the OS, or the Basic Input and Output System ("BIOS"). The boot-up firmware is essentially the machine code typically stored in some form of non-volatile memory to allow a Central Processing Unit ("CPU") to perform tasks such as initialization, diagnostics, loading the operating system kernel from mass storage, and routine input/output ("I/O") functions.

Upon initially supplying power to the CPU through a power-up sequence, the CPU will "boot up" by fetching the instruction code residing in the boot-up firmware. Traditionally, the boot-up firmware is implemented in Erasable Programmable Read Only Memory ("EPROM"). However, recent advances in semiconductor technology have allowed boot-up firmware to be implemented in flash memory, increasing its susceptibility to intrusive attack.

Due to its critical role in computer systems, boot-up firmware should be well protected against intrusive attacks. One type of intrusive attack involves an intruder accessing the computer directly, physically removing a boot-up device containing the boot-up firmware (e.g., flash memory, a printed circuit board containing memory, etc.), and substituting that boot-up device with another boot-up device. In some cases, the intruder may be the legitimate owner or user of the computer system who is trying to defraud third-party service providers.

Currently, mechanical security mechanisms, particularly those used by portable computers to erase important information if the laptop's casing is opened without authorization, has little effect in preventing these intrusive attacks. There are no well-established electronic security mechanisms to provide security protection for a path connecting a host processor and a boot-up device.

Therefore, it would be desirable to design a mechanism that prevents an intruder from successfully defrauding others through replacement of the boot-up device such as a cryptographic coprocessor, or a flash memory device for example. This may be achieved by electrically "binding" the physical bootup device to the host processor to provide a secure path between the host processor and the boot-up firmware. This prevents an attacker from simply replacing the cryptographic coprocessor, since the host processor is unable to execute boot-up instructions not previously encrypted by the specific cryptographic coprocessor to which it has been "imprinted".

SUMMARY OF THE INVENTION

The present invention describes a secure subsystem to prevent unauthorized replacement of a storage device containing a boot-up executable code by establishing a secure path between a secure boot device and a host processor based on an electronic keying mechanism.

The secure boot device is coupled to the storage device and encrypts the executable code based on a secret key to generate an encrypted code. The host processor then decrypts the encrypted code based on the same secret key to generate a decrypted code. The host processor executes the decrypted code only if the decrypted code corresponds to the executable code. A communication path is established between the secure boot device and the host processor to allow the two processors to communicate securely by exchanging such encrypted messages.

BRIEF DESCRIPTION OF THE DRAWINGS

The features and advantages of the present invention will become apparent from the following detailed description of the present invention in which.

DESCRIPTION OF THE PREFERRED EMBODIMENT

The present invention provides a secure path between a host processor and a memory device containing a boot-up program by establishing a secure communication protocol between the host processor and a secure boot device. In the following description, some terminology is used to discuss certain cryptographic features. For example, a "key" is an encoding and/or decoding parameter used by conventional cryptographic algorithms such as Rivest, Shamir and Adleman ("RSA"), Data Encryption Algorithm ("DEA") as specified in Data Encryption Standard ("DES") and the like. A "secret key" is a key used for both encryption and decryption by a limited number of electronic devices having access to that key.

As described below, the secure boot device responds to the requests from a host processor ("host requests") for accessing a boot-up program by encrypting the instruction code in the boot-up program using a secret key shared with the host processor. The encrypted instruction code is decrypted by the host processor using the same secret key. Since the secret key is known only by the host processor and the secure boot device, any attempt to replace the secure boot device containing the boot-up program, will result in incorrect decrypted code making the system inoperable.

Figure 1:
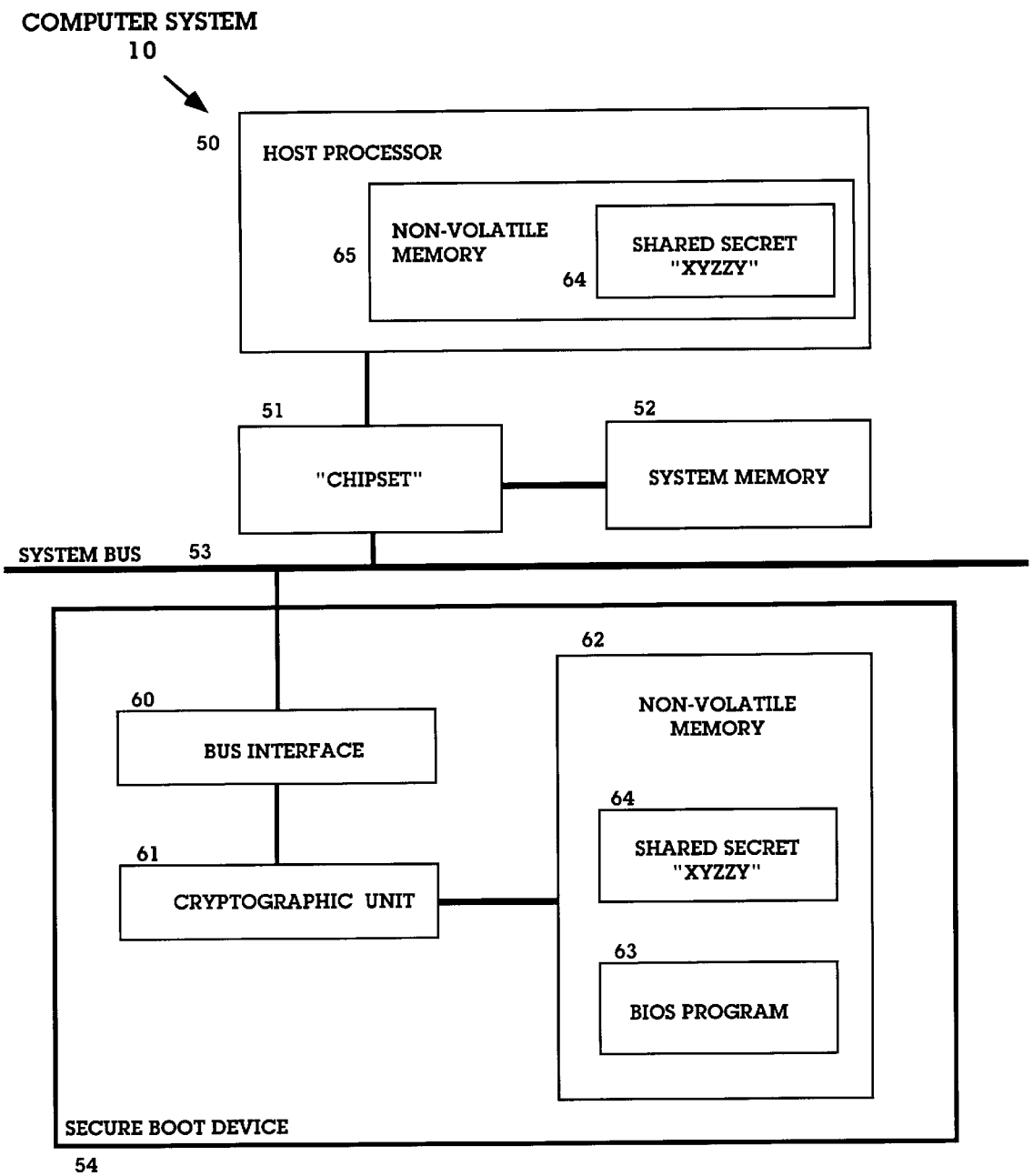
FIG. 1 is a diagram showing the present invention with a secure path between the host processor and the secure boot device, thus enabling a secure boot of the system.

Referring to FIG. 1, an embodiment of a computer system utilizing the present invention is shown. The computer system 10 includes a chipset 51 which operates as an interface to support communications between host processor 50, system memory 52, and devices coupled to a system bus 53. More specifically, host processor 50 includes logic circuitry (not shown) as well as a small amount of internal non-volatile memory 65 used to contain key information. System memory 52 may include, but is not limited to conventional memory such as various types of random access memory ("RAM"), e.g., DRAM, VRAM, SRAM, etc., as well as memory-mapped I/O devices. System bus 53 may be implemented in compliance with any type of bus architecture including Peripheral Component Interconnect ("PCI") and Universal Serial Bus ("USB") and the like.

One of the devices that may be coupled to the system bus 53 includes a secure boot device 54. Secure boot device 54 comprises a bus interface 60, a cryptographic unit 61 and a local non-volatile memory 62. The bus interface 60 is used to establish an electrical connection to system bus 53. The boot-up program 63 is stored within non-volatile memory 62.

Referring still to FIG. 1, both host processor 50 and secure boot device 54 are configured to contain a shared secret key 64 in their respective nonvolatile memories 65 and 62. Established at manufacture during initialization by the Original Equipment Manufacturer or other system suppliers who produce the host processor and the secure boot device, this shared secret key 64 is used for both encryption and decryption by the secure boot device 54 and the host processor 50. The encryption and decryption can be performed through a variety of techniques including specialized hardware circuits, combination of hardware and software, or specialized accelerators. The sequences followed by the host processor 50 and secure boot device 54 for boot-up access during the system power-up ("boot") sequence are described in FIG. 2.

Figure 2:
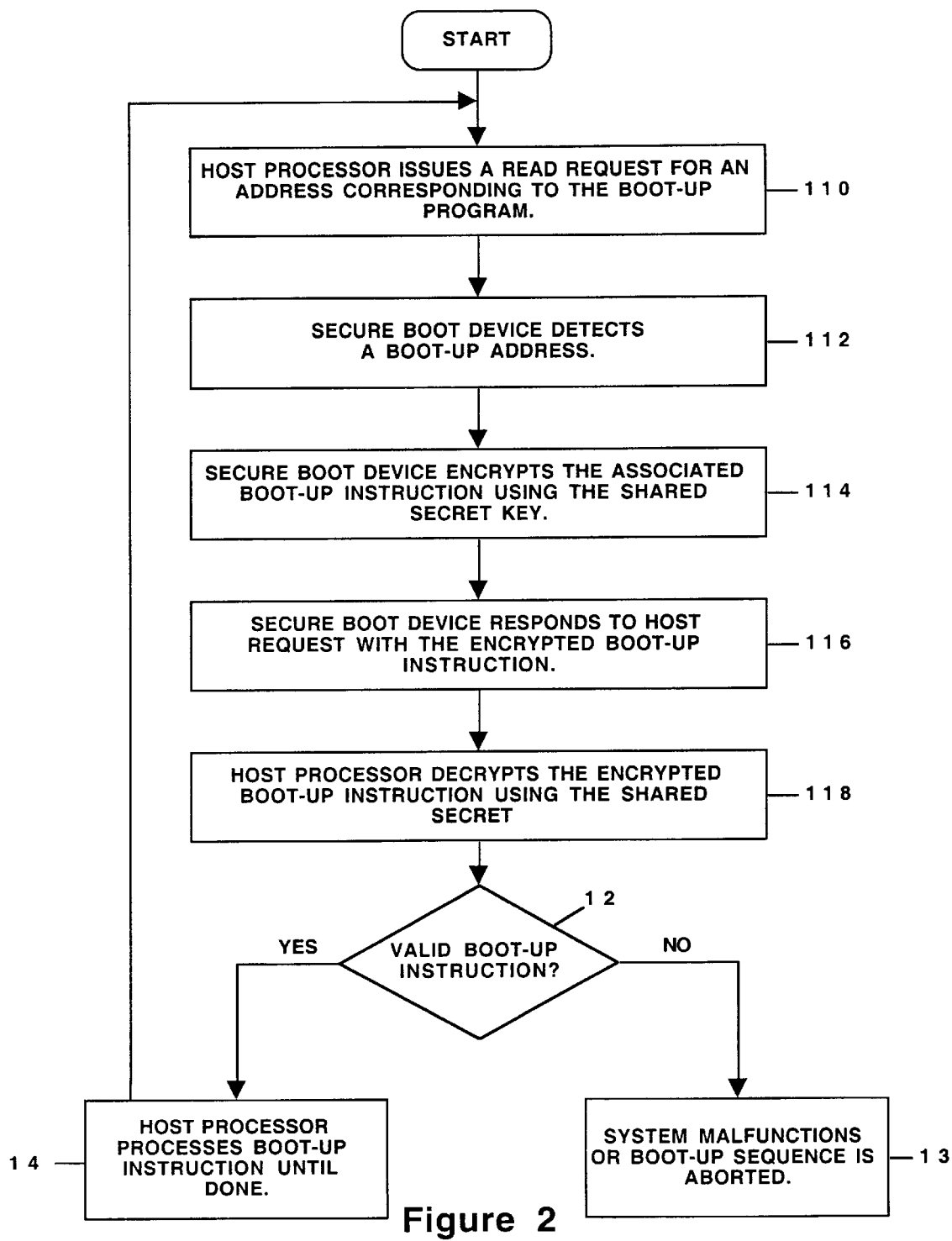
FIG. 2 is a flowchart of the operations that occur in the present invention during a normal read access to the boot-up program by the host processor.

Referring now to FIG. 2, the steps associated with the "boot up" phase of the system are shown. First, in Step 110, the host processor issues a read request for an address corresponding to the boot-up program. The secure boot device detects this boot-up address by having its address space mapped to the corresponding boot-up program (Step 112). Upon detection of the read request, the secure boot device proceeds with encrypting the corresponding boot-up instruction using the shared secret key (Step 114). In Step 116, the secure boot device responds to the host requests with the encrypted boot-up instruction. In Step 118, upon receiving the encrypted boot-up instruction, the host processor decrypts the encrypted boot-up instruction using the shared secret key. In Step 120, the resulting decrypted boot-up instruction may or may not correspond to a correct instruction depending on whether the system has been tampered with or not. If the system has been tampered with, in Step 130, the decrypted boot-up instruction results in an improper or invalid instruction. It is most likely that the system hangs up because of a number of reasons such as bus error, unrecognized opcode, infinite loop, etc. As a result, the boot-up sequence results in system failure. In Step 140, the decrypted boot-up instruction results in a valid or correct instruction in the boot-up program. The host processor executes the instruction and proceeds with the next boot-up instruction until the entire booting sequence is completed.

The shared secret key is known only to the secure boot device and the host processor, and therefore an attempt to subvert the system by replacing the secure boot device by another device is futile. The reason is that the replacement device cannot communicate with the host processor. An intruder, without knowing the shared secret key, cannot duplicate the cryptographic subsystem. The boot-up firmware is therefore protected from the physical replacement of the boot-up device.

Although the above discussion is directed to the secure path between the host processor and the dedicated secure boot device, it is readily realized that the secure path can be established between any number of subsystems, processors, or devices and any combination thereof. A typical secure path involves a secret key shared by all the devices/processors, and encryption/decryption algorithms implemented by either hardware, firmware, or software or any combination thereof.

In another embodiment of the invention (not shown), a chipset with secure boot device functionality containing some boot-up code is interfaced with the host processor. This boot-up code may be a sequence of executable instructions. A secret key shared by the chipset and the host processor is used to encrypt and decrypt the boot-up code. A secure path is established as discussed above.

Yet another embodiment (not shown) involves a printed circuit board ("PCB") or a "smart" card such as the PCM-CIA containing the boot-up program or some executable or information code. The PCB or smart card may be plugged into any expansion slot on the system mother board, or on any backplane interface bus. A secure boot device is coupled to such a PCB or smart card, responding to the host requests by encrypting the boot-up code using a secret key shared by both the board/card and the host processor. The host processor decrypts the encrypted code using the same secret key. The secure boot device may reside on the same PCB or smart card, or anywhere in the system, such as another separate PCB or smart card. As long as the secure boot device is able to communicate with the host processor by exchanging the encrypted or decrypted boot-up code, any attempt to remove the PCB or smart card and replace with another PCB or smart card without the secret key will result in system inoperation.

While this invention has been described with reference to illustrative embodiments, this description is not intended to be construed in a limiting sense. Various modifications of the preferred embodiment, as well as other embodiments of the invention which are apparent to persons skilled in the art to which the invention pertains, are deemed to lie within the spirit and scope of the invention.

What is claimed is:

1. A system for preventing unauthorized replacement of a storage element containing an executable code, comprising:

first cryptographic means coupled to the storage element for encrypting said executable code based on a secret key to generate an encrypted code in response to an access request during a power-up sequence, said first cryptographic means having an address space mapped to the executable code;

second cryptographic means for decrypting said encrypted code based on said secret key to generate a decrypted code, said second cryptographic means to execute said decrypted code if said decrypted code corresponds to said executable code, said second cryptographic means generating said access request corresponding to said address space of said first cryptographic means; and communication means for enabling said first cryptographic means to communicate with said second cryptographic means by exchanging said encrypted code and decrypted code.

2. The system according to claim 1, wherein said first cryptographic means includes a secure boot device.

3. The system according to claim 1, wherein said second cryptographic means includes a host processor.

4. The system according to claim 1, wherein said communication means includes an interface coupled to a bus to allow said first cryptographic means to respond to said access request from said second cryptographic means.

5. The system according to claim 1, wherein said secret key is accessible to said first cryptographic means and said second cryptographic means.

6. The system according to claim 1, wherein said executable code is an Operating System.

7. The system according to claim 1, wherein said executable code is a Basic Input and Output System.

8. The system according to claim 1 wherein the storage element is a modifiable non-volatile memory element.

9. The system according to claim 8 wherein the modifiable non-volatile memory element is a flash memory.

10. A system for preventing unauthorized replacement of an executable code, comprising:

a first processor to contain said executable code and to encrypt said executable code based on a secret key to generate an encrypted code in response to an access request during a power-up sequence, said first processor having an address space mapped to corresponding to the executable code;

a second processor coupled to said first processor, said second processor to generate said access request, and after receiving the encrypted code, to decrypt said encrypted code based on said secret key to generate a decrypted code, and to execute said decrypted code if said decrypted code corresponds to said executable code; and a communication path coupling said first processor to said second processor.

11. The system according to claim 10, wherein said first processor is a secure boot device.

12. The system according to claim 10, wherein said second processor is a host processor.

13. The system according to claim 10, wherein said communication path includes an interface coupled to a bus to allow said first processor to respond to said access request from said second processor.

14. The system according to claim 10, wherein said secret key is accessible to said first processor and said second processor.

15. The system according to claim 10, wherein said executable code is an Operating System.

16. The system according to claim 10, wherein said executable code is a Basic Input and Output System.

17. The system according to claim 10 wherein the storage element is a modifiable non-volatile memory element.

18. The system according to claim 17 wherein the modifiable non-volatile memory element is a flash memory.

19. A method for preventing unauthorized replacement of an executable code contained in a storage element and accessible to a host processor, the method comprising:

providing a security processor which is coupled to said storage element, said security processor being responsive to said host processor;

mapping an address space of said security processor to the executable code;

generating an access request to said security processor during a power-up sequence, the access request corresponding to said address space of said security processor;

encrypting the executable code based on a secret key to produce an encrypted code in response to said access request;

decrypting said encrypted code based on said secret key to produce a decrypted code;

executing said decrypted code if said decrypted code corresponds to said executable code; and establishing a communication path between said host processor and said security processor to allow said host processor to communicate with said security processor.

20. The method according to claim 19, wherein said communication path includes an interface coupled to a bus to allow said security processor to respond to said access request from said host processor.

21. The method according to claim 19, wherein said secret key is accessible to said host processor and said security processor.

22. The method of claim 19, wherein said executable code is an Operating System.

23. The method of claim 19, wherein said executable code is a Basic Input and Output System.

24. The method of claim 19, wherein said storage element is a modifiable non-volatile memory element.

25. The method of claim 19, wherein said security processor is a secure boot device.

26. The method of claim 19 wherein said step of encrypting is performed by said security processor and said step of decrypting is performed by said host processor.

27. The method of claim 24, wherein said modifiable non-volatile memory element is a flash memory.

28. A system for preventing unauthorized replacement of an information, comprising:

first processor to encrypt said information based on a secret key to generate an encrypted information in response to an access request during a power-up sequence, said first processor having an address space mapped to said information;

a second processor coupled to said first processor, the second processor to decrypt said encrypted information based on said secret key to generate a decrypted information, said second processor to use said decrypted information if said decrypted information corresponds to said information, said second processor generating said access request corresponding to said address space of said first processor; and a communication path to enable said first processor to communicate with said second processor by exchanging said encrypted information and decrypted information.

29. The system according to claim 28, wherein said first processor is a secure information device.

30. The system according to claim 28, wherein said second processor is a host processor.

31. The system according to claim 28, wherein said communication path includes an interface coupled to a bus to allow said first processor to respond to the access request from said second processor.

32. The system according to claim 28, wherein said secret key is accessible to said first processor and said second processor.

33. The system according to claim 28, wherein said information includes an Operating System.

34. The system according to claim 28, wherein said information includes a Basic Input and Output System.

35. The system according to claim 28 wherein the storage element is a modifiable non-volatile memory element.

36. The system according to claim 35 wherein the modifiable non-volatile memory element is a flash memory.

* * * * *